(12) United States Patent
Petrou (10) Patent No.: US 6,863,521 B2
(45) Date of Patent: Mar. 8, 2005

(54) TRANSLATION DEVICE FOR AN INJECTION MOLDING APPARATUS

(76) Inventor: Nicoleon Petrou, 2498 Roll Rd., Ste. 407, San Diego, CA (US) 92173

( * ) Notice: Subject to any disclaimer, the term of this patent is extended or adjusted under 35 U.S.C. 154(b) by 141 days.

(21) Appl. No.: 10/305,660

(22) Filed: Nov. 26, 2002

(65) Prior Publication Data

US 2004/0101590 A1 May 27, 2004

(51) Int. Cl.[7] .............................................. B29C 45/66
(52) U.S. Cl. ........................ 425/577; 425/468; 425/589
(58) Field of Search ................................. 425/589, 468, 425/577, 467

(56) References Cited

U.S. PATENT DOCUMENTS 4,285,657 A * 8/1981 Ryder ......................... 425/533

* cited by examiner

Primary Examiner—Tim Heitbrink
(74) Attorney, Agent, or Firm—Frank G. Morkunas (57) ABSTRACT

A molding apparatus have a cavity plate with cavity components thereon spaced significantly apart from one another wherein the cavity components are adapted to translate on the cavity plate to compensate for any misalignment with their corresponding core components. The core plate side has core components thereon spaced significantly apart from one another wherein the core components are adapted to translate on the core plate side to compensate for any misalignment with their corresponding cavity components.

12 Claims, 10 Drawing Sheets

TRANSLATION DEVICE FOR AN INJECTION MOLDING APPARATUS

CROSS REFERENCES TO RELATED APPLICATIONS

Not applicable

STATEMENT REGARDING FEDERALLY-SPONSORED RESEARCH OR DEVELOPMENT

Not applicable

BACKGROUND OF THE INVENTION

This present invention relates to an improvement in a molding apparatus, and more particularly to injection molding.

Conventionally to mold plastic products a user must craft a molding apparatus having a 'top' portion [core] and a 'bottom' portion [cavity]. Typically these portions [core and cavity] are vertically disposed such that they stand side to side with one portion being fixed and stable and the other portion being movable. The cavity side generally houses one or more cavity components and the core side generally houses an equivalent number of core component. Typically the cavity side is the stable side and the core side is the moving side. The cavity side houses the flow channels through which liquified plastic flows through and into the abutting cavity and core sides and houses the heating elements to generate the heat necessary to maintain the liquidity of the plastic material. Each side also has water ducts or channels through which water heated from an outside source passes thereby heating the respective side as necessary.

In operation, the moving side is pushed and pressed into the stable side. A seal is formed where the two sides meet. The cavity side has a pocket into which the core of the core side fits. Cuts are made in the core or in the pocket or both to form the desired finished product. If the cuts are both in the pocket and core, these cut or voids are to correspond to one another and provide the avenues of flow for the liquified plastic. This void form will be referred to herein as the cavity-core mold. The cavity-core mold represents the desired finished product after liquified plastic has been forced thereinto and permitted to cure/cool as necessary. A seal between the cavity side and the core side prevents the liquified plastic from escaping from the cavity-core mold so established.

Each side is heated to a prescribed temperature to accept the flow of liquified plastic. The heating process typically entails the use of water being received from and heated by an external source. The heated water is forced into the mold through the water channels in the mold. The liquified plastic is forced through a flow channel on the stable side and into the cavity pocket and core flowing into and filling the cavity-core mold therein. Heating elements, separate from the heated water and its conduits, in the molding apparatus maintain a prescribed heat to maintain the liquidity and flow of the plastic into the cavity-core mold. Typically, water [and therefore, mold] temperatures range from approximately 120° to approximately 180° [all temperatures herein, unless otherwise stated, are represented in terms of Fahrenheit]. These temperatures will vary depending on the type of material being used to generate the finished product. The water is also used, as necessary to cool the mold as needed. Typically, for thicker products, a lower temperature is sufficient; whereas for thinner products, a higher temperature is necessary to maintain the liquidity of the plastic. The liquified plastic entering the flow channels enters at a temperature ranging from approximately 380° to approximately 440°; depending on the type of plastic being used.

The molding apparatus is made of metal and is heat-conductive and heat-retentive. The natural properties of such heat cause the molding apparatus and its component parts to expand when heat is applied. To limit the adverse effects of expansion, experience has found that the maximum number of cavity-core components on each side of a mold should be four; again, this all depends on the size and type of the desired finished product. In the case of producing strawberry mesh baskets, the maximum is four. Typically, therefore, on the stable side, there are four cavity components abutting one another held firmly in place down and inside the mouth of a cavity plate and on the moving side, and there are four corresponding core components firmly held in place in a core plate. The heat expands the various components, the various components press against adjacent components during expansion, and against the side walls of the mouth of the cavity plate. After time, will crack one or more component parts of the molding apparatus. Use of four cavity-core paired components has reduced, though not eliminated, damages caused by heat expansion. Using more than four such paired components with the cavity components down and inside the mouth of a cavity plate requires a larger cavity plate. Use of more than four will increase production but also, because of the required size of the cavity plate it has been found to cause damage to the molding apparatus sooner. Such, therefore, is not practical under the current art configurations of the molding apparatus.

The component parts for a molding apparatus are costly to produce and consequently to replace. A delicate temperature balance must be maintained to prevent such damage for as long as is possible. Heating channels in the cavity plate also can act to cool the plates as the water flowing through the channels may be regulated to be less than the heat of the plastic and in the respective plates in attempts to maintain this delicate balance. If the plates are cooled too much, the liquified plastic will lose some of its properties prior to being cured resulting in an inferior or unacceptable finished product.

Another problem associated with multiple cavity-to-core components as described above is that, through expansion and contraction, the fit between the cavity component and the core component [pocket-to-core fit or cavity-core mold] may not be as precise as is necessary to create the desired finished product. This is particularly the case when the product desired is a container having a bottom and upstanding perimeter sides, all of which [bottom and sides] are to be mesh-like; i.e., thin strips of plastic with significant spacing between which form the container. Akin to a mesh screen with the mesh openings being significantly large. The shape of the strips may form square-like or diamond-like shapes or any shape desired. Containers such as these are typically used in supermarkets for housing strawberries for example. The use mentioned here is illustrative only and not limitational.

The molding apparatus here requires precision manufacture and precision execution for the desired product to be realized. To this end, grooves are generally cut onto the exterior of the core with no grooves on the interior of the cavity pocket [as described earlier, grooves may also be cut onto the exterior of the cores with corresponding grooves cut within the interior of the cavity; though, for the description which follows, only the core elements is cut]. The grooves or voids on the core will be referred to herein as the cavity-core mold. In those areas where there are no grooves cut on the core then, the core, when pressed into the pocket, will be flush on the pocket surface with no spacing between thereby preventing any liquified plastic to flow thereinto. These sections will form the basis of the 'holes' in the mesh-like container. When the moving side of the mold engages the stable side of the mold, the cavity and core components are relatively flush with one another except for the grooves cut into the core. It is into these grooves that the liquified plastic is forced and which forms the desired container. If the fit between the core component and the cavity component is not precise when the moving side is pressed into the stable because, as is typically the case, of expansion which leads to minor misalignment between the centers of the core component and the cavity component, a slightly greater void is formed on one or more sides of this 'fitted' cavity-core mold. The portions of the pocket and core which should be flush are not. As liquified plastic is forced into the fitted mold, more plastic than is desired flows into the larger void. The result is a container not having uniform meshing; i.e., some of the desired holes between the plastic strips is partially or completely filled in. This is not the desired result and also results is use of more plastic material than necessary.

No one has been able to significantly reduce the heat-expansion problems addressed above, nor can anyone control the natural expansion associated with heat application, nor has anyone been able to significantly cure the misalignment problem associated with heat expansion of prior art mold apparatus configurations. The natural properties of materials are such that they will expand with heat and contract with cold. The present invention has addressed these matters and has cured these deficiencies by accommodating for heat expansion and misalignment associated therewith by configuring a molding apparatus having a floating cavity component or a floating core component or both.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF SUMMARY OF THE INVENTION

The above-noted problems, among others, are overcome by the present invention. Briefly stated, the present invention contemplates a molding apparatus have a cavity plate with cavity components thereon which are spaced significantly apart from one another to reduce or eliminate damage cause by heat expansion. The cavity components are adapted to translate on the cavity plate to compensate for any misalignment with their corresponding core components into which they are pressed in the molding process. The core plate side has core components thereon which also may be spaced significantly apart from one another in alignment with their respective cavity components. The core components are adapted to translate on the core plate side to compensate for any misalignment to/with their corresponding cavity components into which they are pressed in the molding process.

The foregoing has outlined the more pertinent and important features of the present invention in order that the detailed description of the invention that follows may be better understood so the present contributions to the art may be more fully appreciated. Additional features of the present invention will be described hereinafter which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

For a fuller understanding of the nature and objects of the invention, reference should be had to the following detailed description taken in conjunction with the accompanying drawings in which.

DETAILED DESCRIPTION OF THE INVENTION

Figure 1:
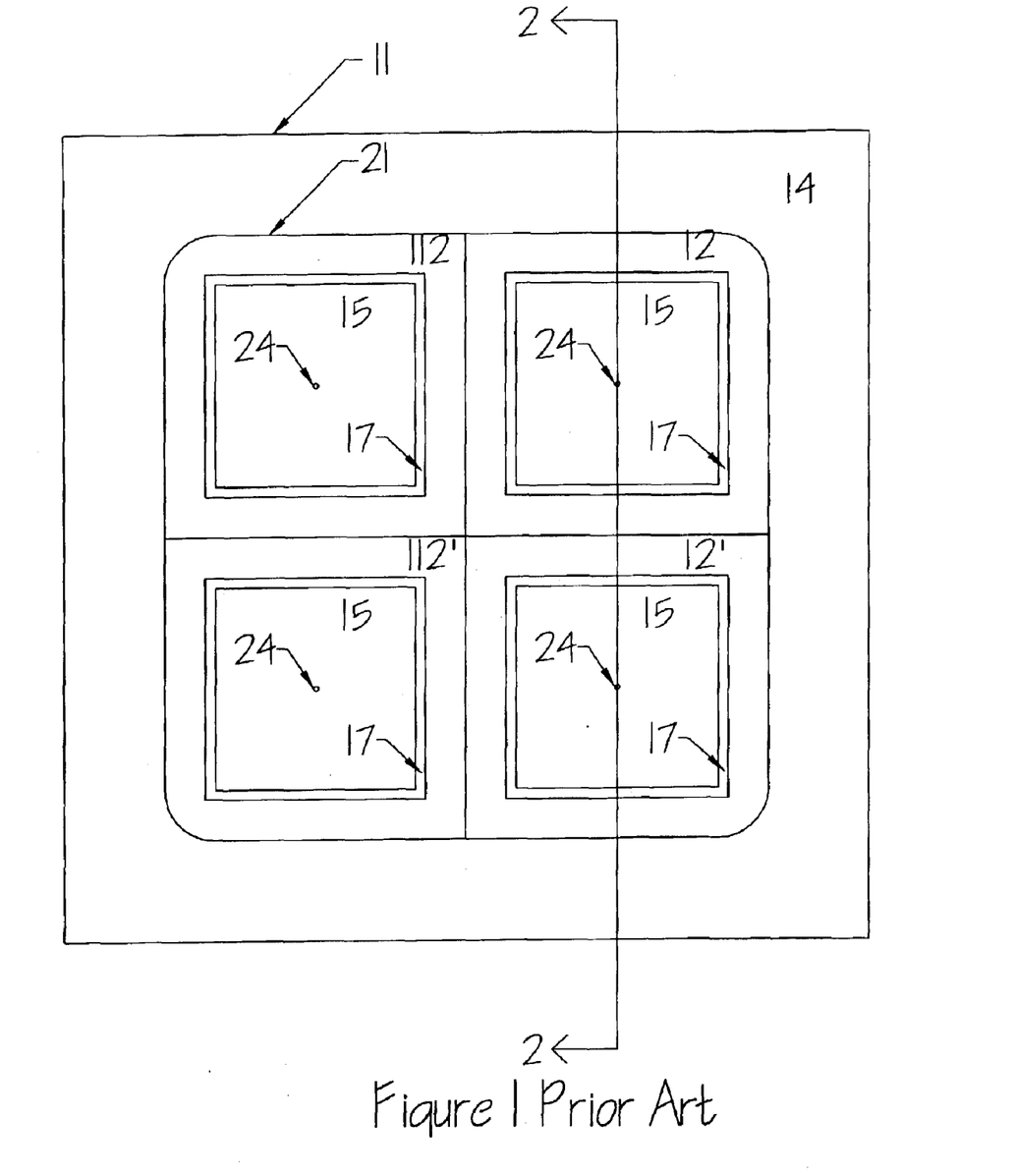
FIG. 1 is plan view of a prior art stable side of a molding apparatus.

Referring now to the drawings in detail and in particular to FIG. 1, reference character 11 generally designates a stable [non-moving] side of a prior art molding apparatus 10. Generally the stable side provides the entrance means for the materials [typically plastics] being injected into the molding apparatus 10. The stable side 11 has a cavity plate 14 with a mouth therein to receive and securely house the cavity components 12, 12', 112, 112' [four such components in this illustration]. As earlier described, because of the physical properties of the molding apparatus and its component parts, four is the most practical and efficient number of such components. Even with four, through heat expansion, stress, the cavity plate 14 will crack or break. Employing more than four will cause cracking and breakage sooner.

The tops of the cavity components are flush with the top of the cavity plate 14. In this configuration, each cavity component also abuts two other cavity components at reference point 21 and also abuts the side walls of the mouth of the cavity plate 14. Each cavity component further has a pocket 15 which receives a corresponding core component 32, 32' [illustrated in FIG. 2]. As such, the pocket 15 is an open space. At the bottom of the pocket 15 is an entry port 24 for the liquified plastic material to enter. At the top of the pocket is a recess 17 [which will form the top ring of the desired container]. The cavities illustrated here are crafted to produce mesh-type containers. In this illustrated prior art embodiment, no grooves are cut into the bottom and sides of the respective cavities only on the top 17 which will form the top border of the container—the grooves to form the container are cut on the cores 32, 32'. When the moving side 13 is pressed into the stable side 11, the cores, except for the grooves, are to seat flush into the pockets. The grooves, in capillary-like fashion, cris-cross each other ultimately leading up to the recess 17. The only void or spacing in this core-cavity matchup [referred to herein as cavity-core mold] are the voids created by the grooves in the core and the recess on the top of the cavity. These core-cavity voids form the shape of the desired container.

The moving side 13 and the stable side 11 also are flush at their respective points of contact; i.e., cavity plate 14 flush to core plate 34. When liquified plastic is injected through the entry port 24, the liquid plastic flows through and fills the grooves of the core 32 and fills the upper recess 17 [cavity-core mold] thereby forming the desired container. A typical mesh-type container of this creation is generally used for various fruits and vegetables; particularly strawberries. It should be understood that this example is for the sake of clarity and understanding of the molding operation; it is not meant for, nor should it be construed as, a limitation. Any type of container may be made with this prior art molding apparatus as well as the molding apparatus of the present invention. Very little plastic material is used if the cavity-core molds are perfectly aligned and in good working order. Such is not always the case with such prior art molders.

Figure 2:
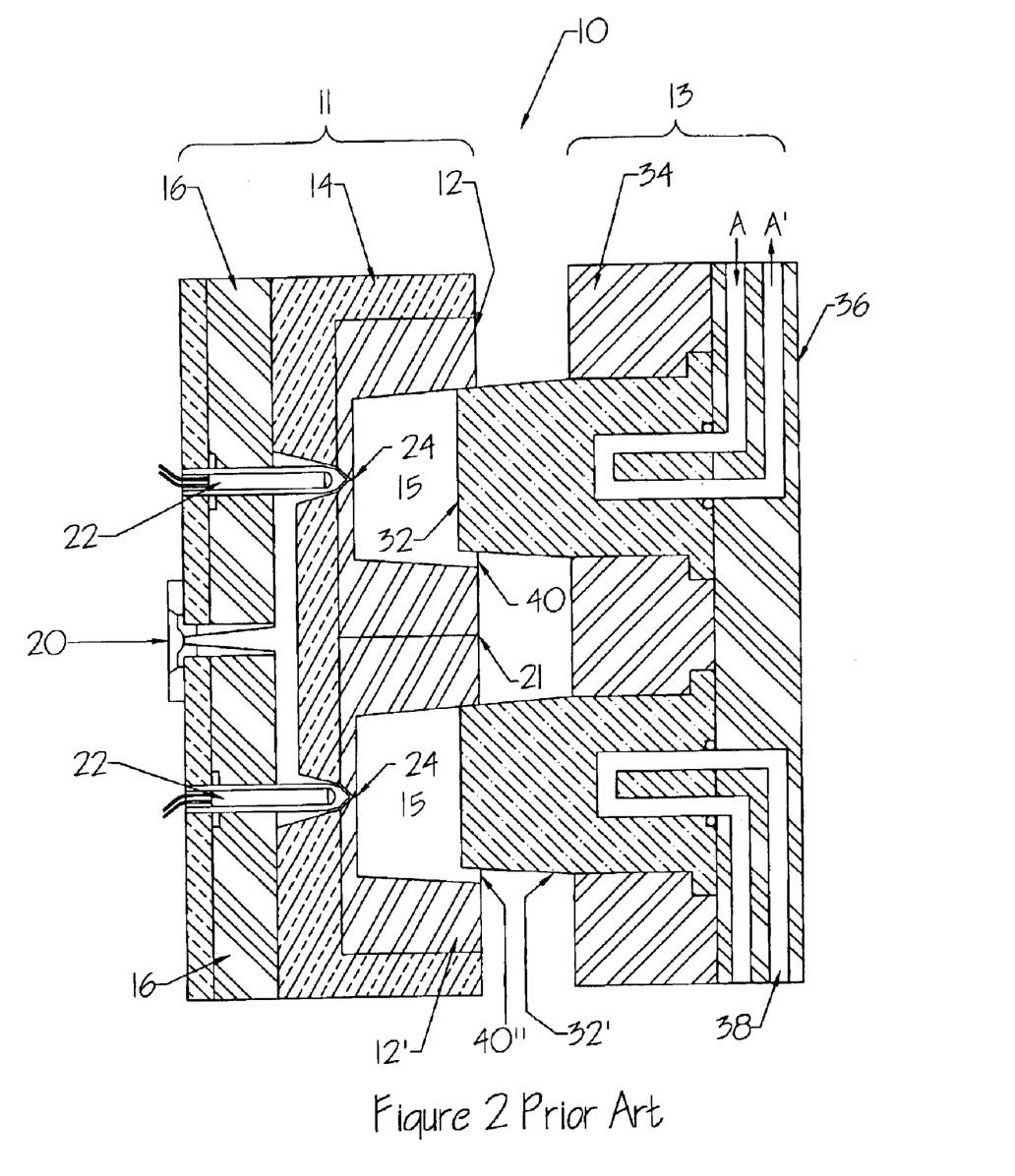
FIGS. 2 and 3 are a cross-section detail view of a prior art complete molding apparatus taken on line 2—2 of FIG. 1.
Figure 3:
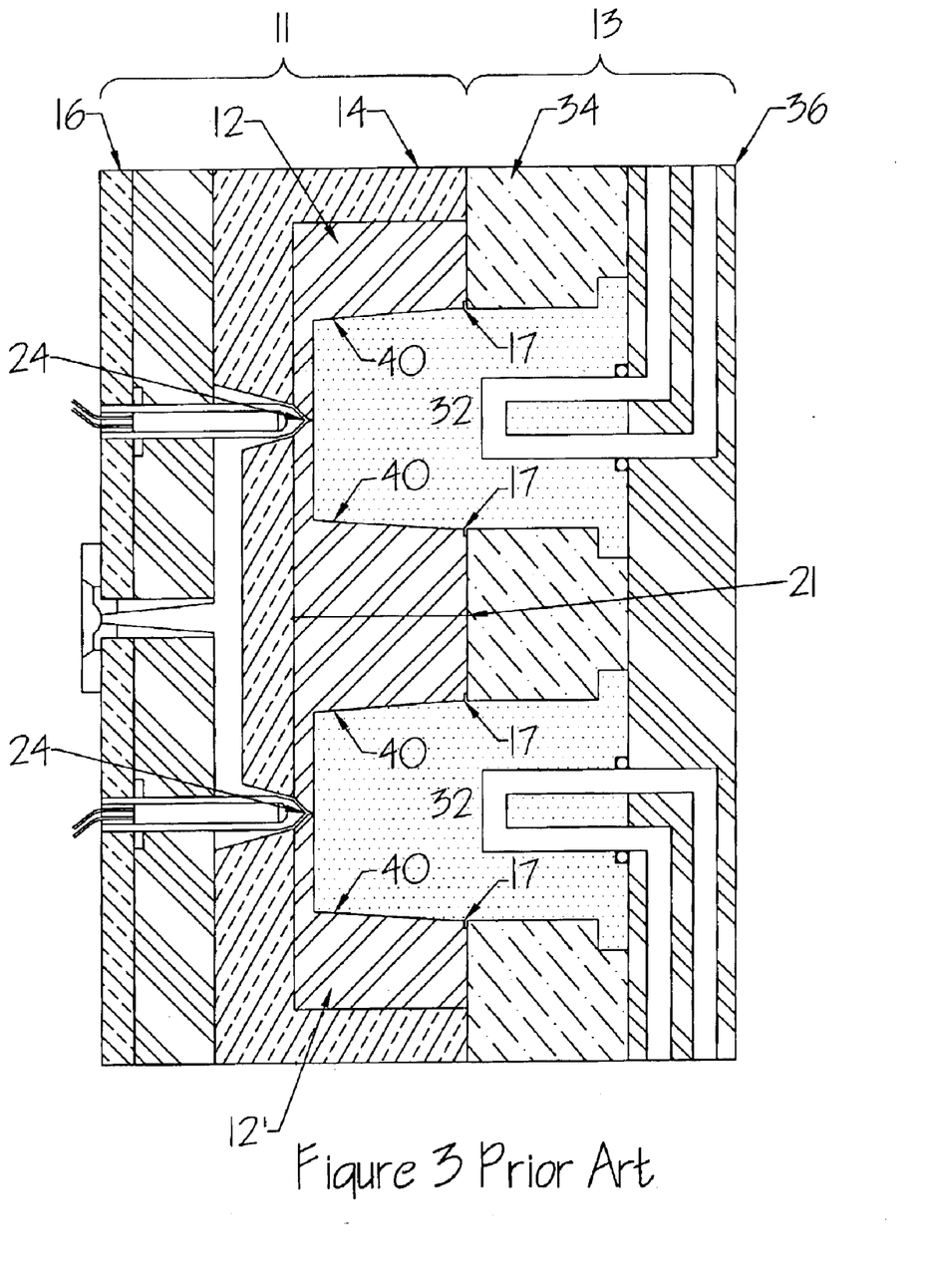

FIGS. 2 and 3 further illustrate this prior art molding apparatus in more detail and the alignment problems associated therewith. FIG. 2 reflects a misalignment problem whereas FIG. 3 illustrates a proper alignment. Turning to FIG. 2, the moving side 13 illustrates the moving [core] back plate 36 to have core heating and cooling channels 38. A suitable heating and cooling component, such as, but not limited to, water enters, by way of example only, not limitation, in the direction of arrow A, flows through the channel 38, into and out of the core, exiting the moving back plate 36 in the direction of arrow A'. A similar heating and cooling configuration and process, though not illustrated, is in the stable side 11. Heating elements 22 in the stable side 11 regulate the heat necessary to maintain the plastic in its liquified state such that the liquified plastic may pass into all grooves and recesses which form the mold [cavity-core mold] to form the desired finished product. The liquified plastic, at temperatures ranging from 380°–440°, enters the cavity-core mold through the flow channel 24 and fills the cavity-core mold. From normal use, the heat contraction on the abutting cavity components inside the cavity plate 14 are pressured and stressed from all sides and on to and from the side walls in the mouth of the cavity plate 34 with competing forces and the cavity components or cavity plate or both ultimately will crack or mis-align or both. With such misalignment to cavity-to-core fit, however slight, renders the fit uneven and produces mis-alignment to the cavity-core mold and a defective finished product in that one side may have a greater void than the other side thereby causing liquified plastic to fill in that void to such an extent that the wire-mesh container has its holes of the mesh on that side completely or partially filled in. The voids caused by such misalignment are represented in FIG. 2 as reference characters 40', 40" [the voids 40', 40" are represented in exaggerated fashion here for ease of identification and are shown in cavity 12', pocket 15', and core 32']. FIG. 3 represents a proper alignment of the moving side 13 and the stable side 11.

Figure 4:
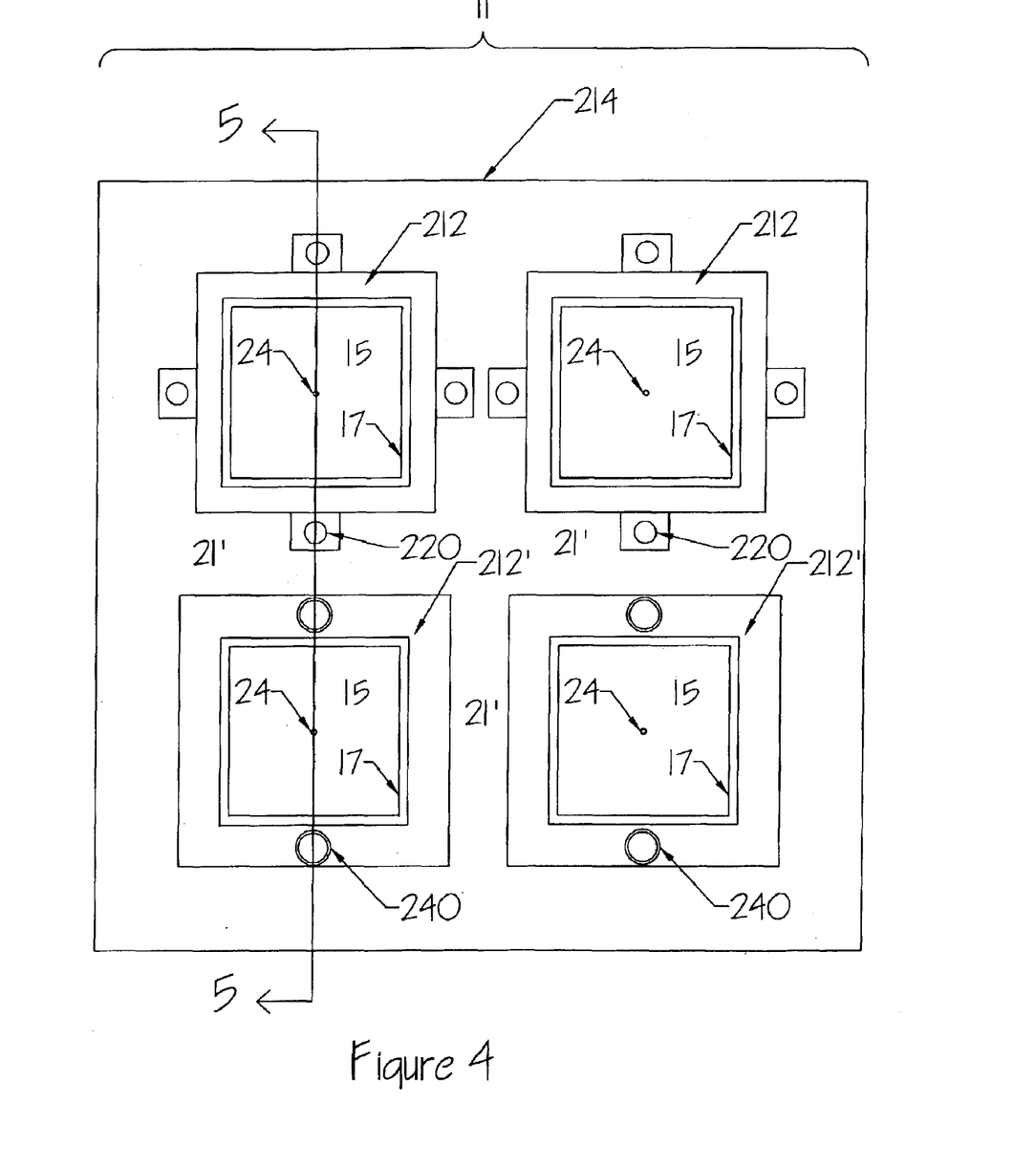
FIG. 4 is plan view of the stable side of a molding apparatus of the present invention.
Figure 5:
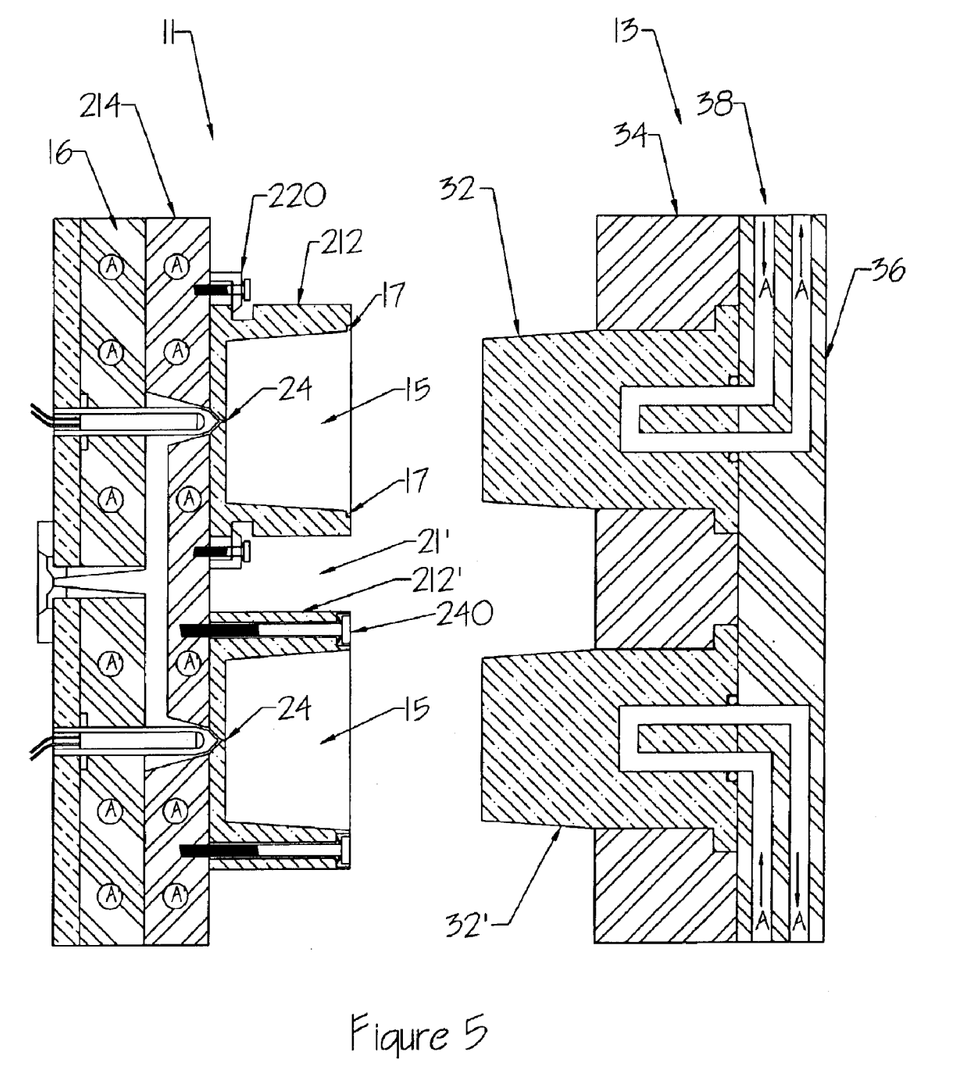
FIGS. 5 and 6 are cross-section detail views of a complete molding apparatus of the present invention taken on line 5—5 of FIG. 4.
Figure 6:
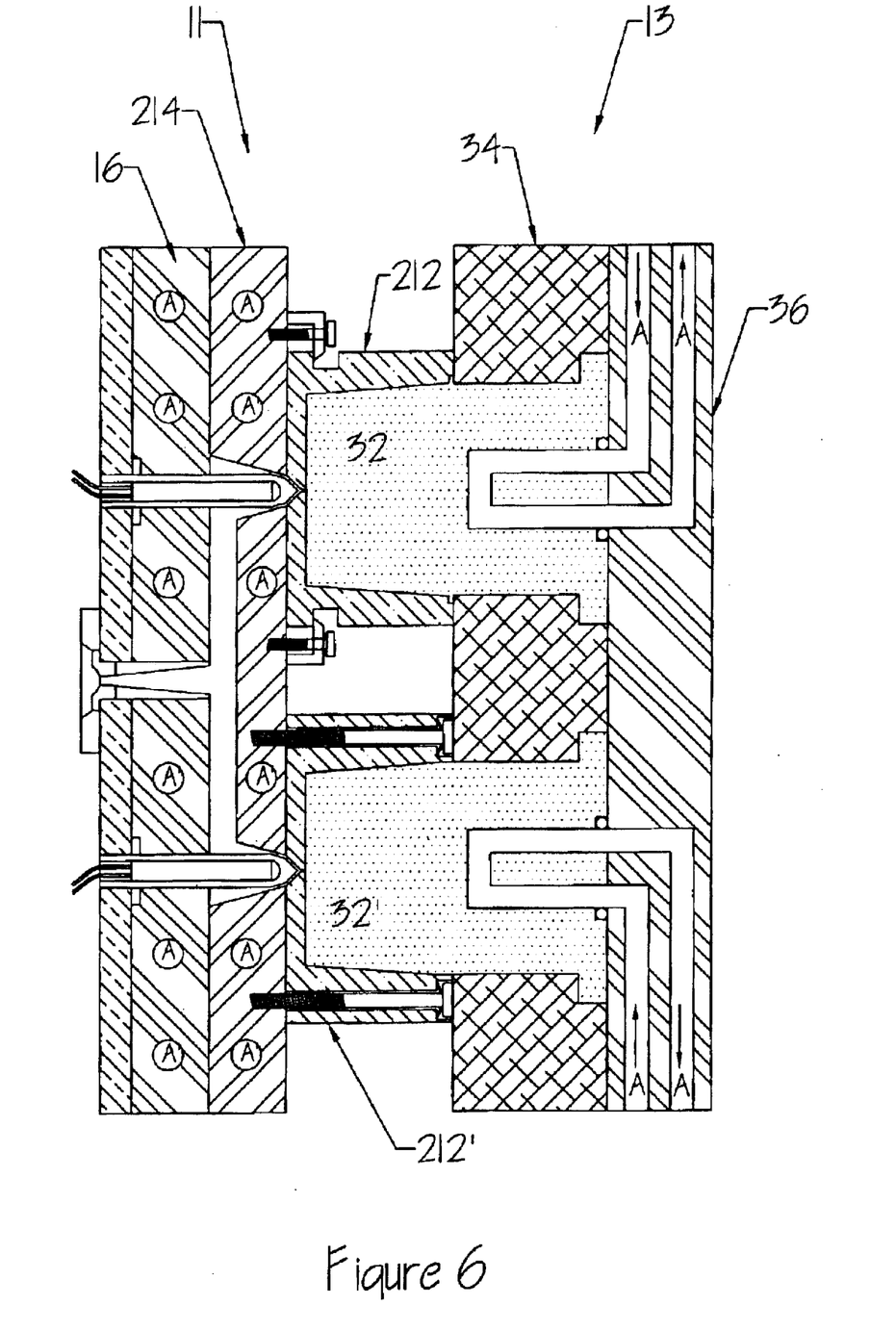

Attention is now invited to FIGS. 4 through 6 representing a molding apparatus constructed in accordance with a preferred embodiment of the present invention. The cavity plate 214 is relatively flat on top and is without a receiving mouth for the cavity components 212, 212'. Each cavity component 212, 212' stands alone and does not abut the walls of a mouth as in the prior art configuration nor does any cavity component 212, 212' of the present invention abut any other cavity component. The spacing between the cavity components 212, 212' is represented by reference character 21'. This spacing 21' and the stand-alone concept represents a novelty missing in all other related prior art molding devices. The other component parts previously described as to the heating elements 22, the heating and cooling configuration, the entry port 24 for the injected material, and the cavity-core mold are relatively the same. It is this spacing 21', rather than having the cavity components all abut one another and the walls of the mouth into which they are seated as in the prior art configurations, the cavity components of the present invention stand alone and their exterior upstanding walls are free from interference—they abut nothing but the spacing 21'. With expansion, they face no pressure or stress from other abutting cavity components or from the inner walls of the mouth of the cavity plate.

The unique mechanisms of retaining the stand alone cavities 212, 212' [and the stand alone core components 232] are another novel feature of the present invention and are illustrated as reference characters 220, 240. These retaining mechanisms permit movement or translation of the stand-alone cavity components 212, 212' on the cavity plate 214 in any direction, from 0.01° to 360.0°, as necessary to accommodate any misalignment of the respective core components caused by heat expansion. As the moving side 13 is pressed onto the stable side 11 any defects to alignment of the core components is contemporaneously corrected by the translation of the corresponding cavity component to compensate for the misalignment. FIG. 5 illustrates the stable side 11 and the moving side 13 apart whereas FIG. 6 illustrates the two sides pressed and flush together.

Figure 7:
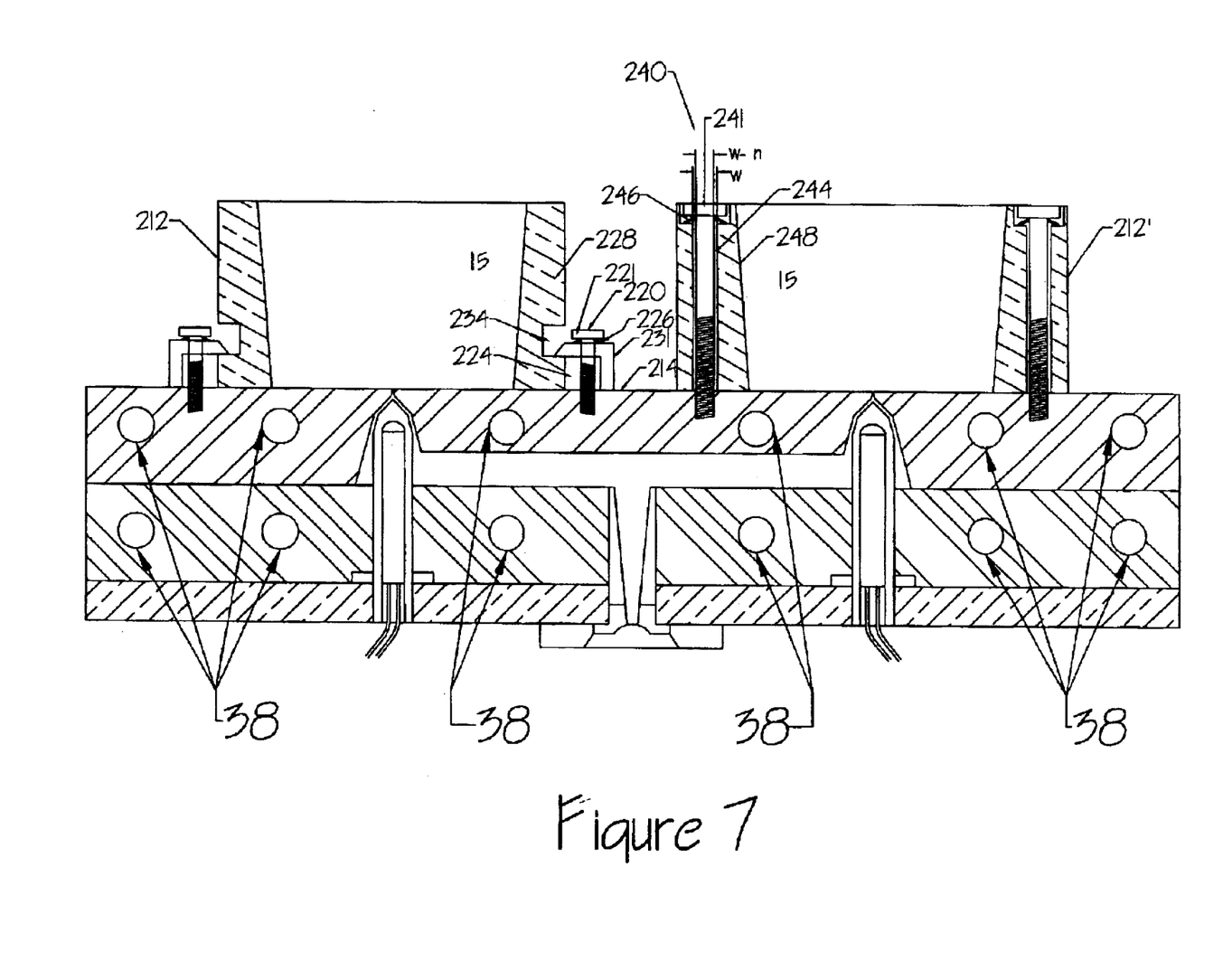
FIG. 7 is a detailed view of the retaining mechanisms on the cavity component.
Figure 8:
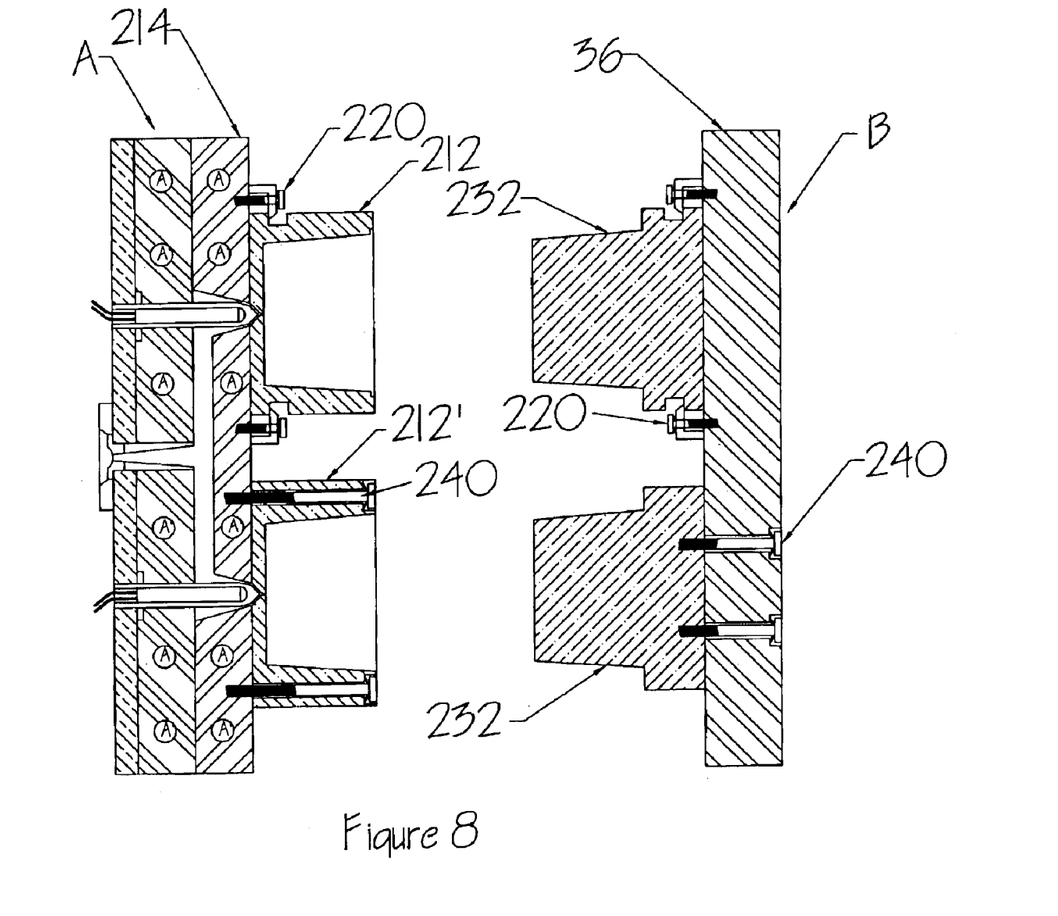
FIGS. 8 through 10 are cross-section detail views of a complete molding apparatus of two different embodiments of the present invention taken on line 5—5 of FIG. 4.
Figure 10:
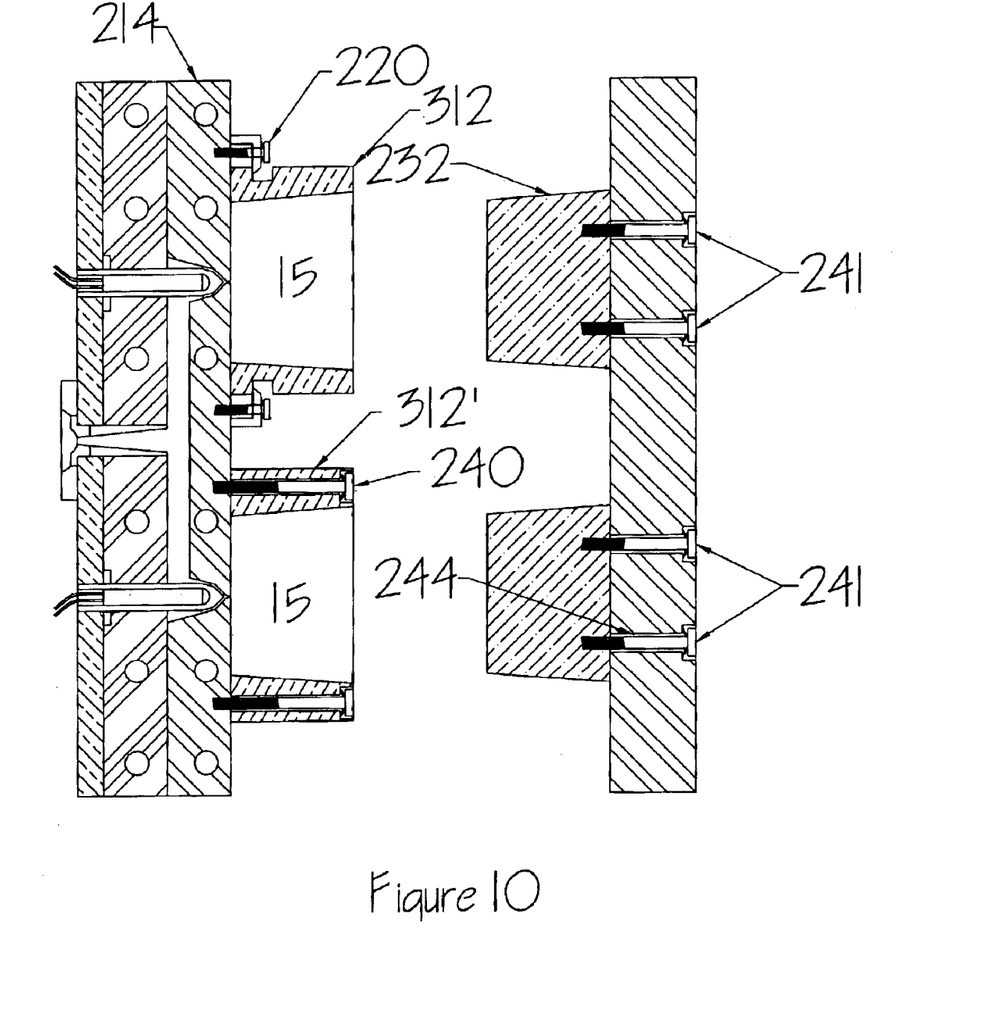

The unique mechanisms which permit for the stand-alone configuration of the cavity components 212, 212' [as well as the stand-alone configuration of the core components 232 as illustrated in FIG. 8] is illustrated in grater detail in FIG. 7. The retaining mechanism for the stand-alone structure is configured of a suitable fastening member to fasten the cavity component 212, 212' [or the core component 232] to the cavity plate 214; i.e., its receiving plate [or the core plate 34 or to the moving core plate 36; i.e., its receiving plate] in such a fashion as to secure the respective component yet permit the respective component to translate in any direction necessary on its receiving plate to thereby adjust to and compensate for any misalignment between the respective core component 32, 232 and corresponding cavity component 212, 212', 312 and pocket 15. As shown in FIG. 7, one such embodiment 240 for a retaining mechanism has a gap 244 transversing the side wall 248 of the stand-alone cavity component 212' [or, in the case of one embodiment of the core component 232, through the back of the core plate 34 and into the core component 232 as illustrated in FIG. 10]. A suitable fastener 241 inserts into and through the gap 244 and is secured to a cooperating receiving member on the cavity plate 214. As illustrated here the fastener 241 is a threaded bolt secured in cooperating threading on the cavity plate 214.

The key to this translating concept is to firmly hold the stand-alone cavity component 212' to the cavity plate 214 yet permit the cavity component 212' to move in any direction on the cavity plate 214 to compensate for any misalignment to the corresponding core component. This is accomplished by the gap 244 being wider than the width of the fastener 241. In this regard, where the width of the gap is represented by W, the width of the fastener must be W-n. A biasing washer 246, or similar compression washer, lock washer, or flexible washer, assists to maintain the stand-alone cavity component 212' securely to the cavity plate 214 from the pressure exerted thereby. How the stand-alone cavity component 212' [or the stand-alone core component 232] is held to the respective retaining plate is not critical, what is important that a gap, such as, but not limited to, the gap 244 described above, be created and maintained. The gap 244 permits the movement desired to facilitate correcting adjustments to misalignments.

The gap for translation may also be configured not from transversing completely through the side wall 248 [or through the core back plate 34 as shown in FIG. 10], but as a gap 234 into the side wall 228 as illustrated in FIG. 7 for stand-alone cavity component 212. The gap 234 here is a recess cut into the side wall 228. A suitable bracket 231 through which a suitable fastener 221 inserts and fastens into the cavity plate 214 and securely holds the bracket 231 and the stand-alone cavity component 212 in the cavity plate 214. A space 224 between the fastener 221 and the side wall 228 coupled with the gap 234 in the side wall 228 accommodates the movement of the stand-alone cavity component 212 and entry of the bracket 231 thereinto. As with the first retaining mechanism 240 described earlier, a biasing washer 226, or similar compression washer, lock washer, or flexible washer, assists to maintain the stand-alone cavity component 212 securely to the cavity plate 214 from the pressure exerted thereby yet permits translation thereon. Though the stand-alone cavity components 212, 212' have been shown to contain both retaining mechanisms 220, 240 on the same cavity plate 214, such was for illustration purposes only, not by way of any limitations. Either one, both, or any combinations thereof may be used to hold and permit translation any embodiment of the stand-alone cavity components of the present invention on the cavity plate 214 as well as any embodiment of the core components of the present invention.

FIG. 8 illustrates a stand-alone core component 232 held by its lip around the core component 232 by either retaining mechanism 240, 220 or both or any combination above. The description and functionality and operation of these retaining mechanisms 240, 220 are similar to those describe above for the stand-alone cavity components 212, 212'.

Figure 9:
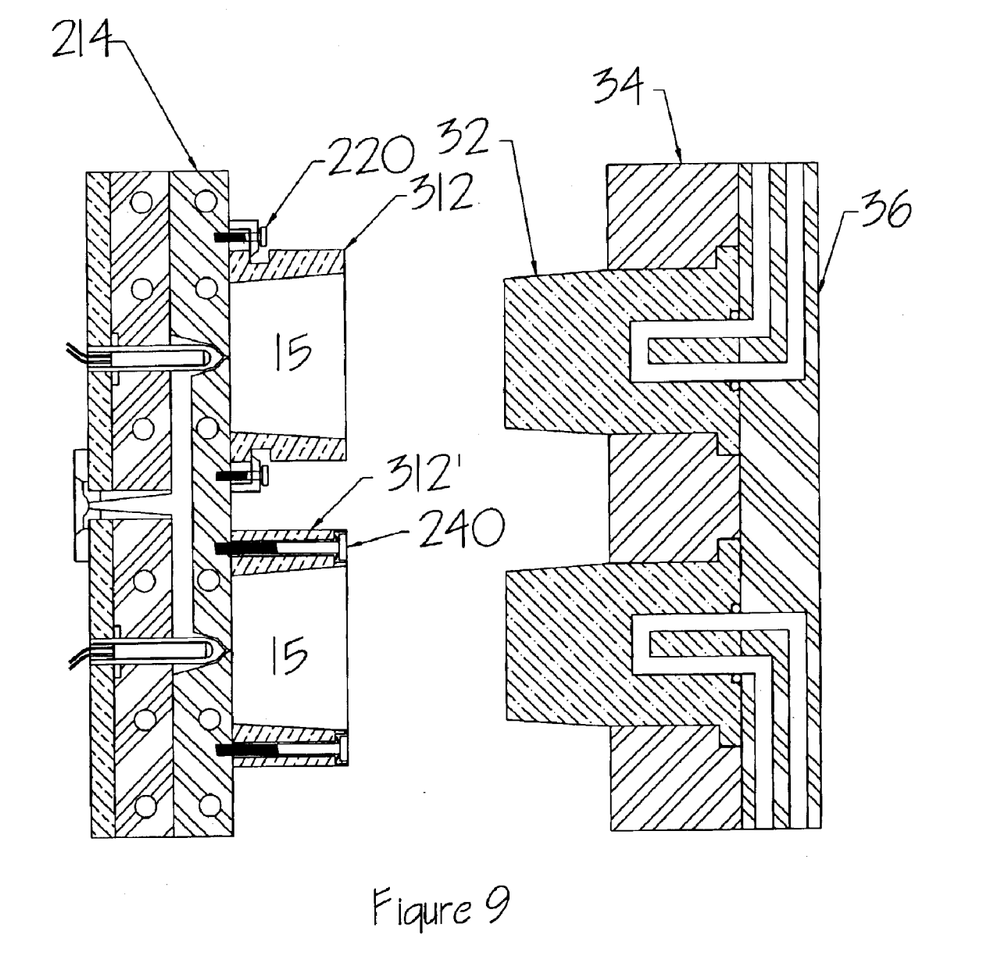

FIG. 9 illustrates another embodiment of a stand-alone cavity component 312. Like the other stand-alone components described above, it utilizes retaining mechanisms 240, 220 in any combination. The stark difference between this stand-alone cavity component 312 and the previously describe stand-alone cavity components 212, 212' is that it has not bottom surface. The pocket 15 within runs from its mouth to and through its bottom. FIG. 10 illustrates mounting of the core components 232 from the back-side of the core plate rather than from the front side as was illustrated in FIG. 8.

The present disclosure includes that contained in the present claims as well as that of the foregoing description. Although this invention has been described in its preferred forms with a certain degree of particularity, it is understood that the present disclosure of the preferred forms has been made only by way of example and numerous changes in the details of construction and combination and arrangement of parts and method steps may be resorted to without departing from the spirit and scope of the invention. Accordingly, the scope of the invention should be determined not by the embodiment[s] illustrated, but by the appended claims and their legal equivalents.

The invention claimed is:

1. An injection molding apparatus comprising:
    (a) a core component side having one or more core components thereon;
    (b) a cavity component side having one or more cavity components thereon, each of said one or more cavity components corresponding with the one or more core components; and
    (c) translation means for translating said one or more core components into a relatively even alignment with said corresponding one or more cavity components or for translating said one or more cavity components into a relatively even alignment with said corresponding one or more core components, or both, to thereby establish a relatively even fit between said one or more core components and said corresponding one or more cavity components when the respective components are pressed together, wherein said translation means for said one or more cavity components comprises one or more apertures tranversing a wall of said cavity component, said one or more apertures having a width "W" through which a fastening member inserts and fastens said one or more cavity components to a cavity plate, said fastening member having a width less than said width "W" defining a gap therein to thereby permit lateral movement of said one or more cavity components to an extent approximately equal to said gap.

2. The apparatus as claimed in claim 1 wherein said one or more core components are stand-alone core components, attached to and extending away from a core plate, whereby a significant space is defined between each of the said one or more core components at their point of attachment to said core plate.

3. The apparatus as claimed in claim 1 wherein said one or more cavity components are stand-alone cavity components, attached to and extending away from said cavity plate, whereby a significant space is defined between each of the said one or more cavity components.

4. An injection molding apparatus comprising:
    (a) a core component side having one or more core components thereon;
    (b) a cavity component side having one or more cavity components thereon, each of said one or more cavity components corresponding with the one or more core components; and
    (c) translation means for translating said one or more core components into a relatively even alignment with said corresponding one or more cavity components or for translating said one or more cavity components into a relatively even alignment with said corresponding one or more core components, or both, to thereby establish a relatively even fit between said one or more core components and said corresponding one or more cavity components when the respective components are pressed together wherein said translation means for said one or more cavity components comprises one or more recesses on an exterior wall of said one or more cavity components, said one or more recesses adapted to receive a fastener means and retain a gap in said recess and from said exterior wall, said fastener means for fastening said one or more cavity components to a cavity plate and to permit lateral movement on said cavity plate to an extent approximately equal to said gap defined in said recess and from said exterior wall.

5. The apparatus as claimed in claim 4 wherein said one or more core components are stand-alone core components, attached to and extending away from a core plate, whereby a significant space is defined between each of the said one or more core components at their point of attachment to said core plate.

6. The apparatus as claimed in claim 4 wherein said one or more cavity components are stand-alone cavity components, attached to and extending away from said cavity plate, whereby a significant space is defined between each of the said one or more cavity components.

7. An injection molding apparatus comprising:
 (a) a core component side having one or more core components thereon;
 (b) a cavity component side having one or more cavity components thereon, each of said one or more cavity components corresponding with the one or more core components; and
 (c) translation means for translating said one or more core components into a relatively even alignment with said corresponding one or more cavity components or for translating said one or more cavity components into a relatively even alignment with said corresponding one or more core components, or both, to thereby establish a relatively even fit between said one or more core components and said corresponding one or more cavity components when the respective components are pressed together wherein said translation means for said one or more core components comprises one or more apertures tranversing a core plate, said one or more apertures having a width "W" through which a fastening member inserts and fastens to said one or more core components for fastening said one or more core components to said core plate, said fastening member having a width less than said width "W" defining a gap in said one or more apertures of said core plate to thereby permit lateral movement of said one or more core components to an extent approximately to said gap.

8. The apparatus as claimed in claim 7 wherein said one or more core components are stand-alone core components, attached to and extending away from said core plate, whereby a significant space is defined between each of the said one or more core components at their point of attachment to said core plate.

9. The apparatus as claimed in claim 7 wherein said one or more cavity components are stand-alone cavity components, attached to and extending away from a cavity plate, whereby a significant space is defined between each of the said one or more cavity components.

10. An injection molding apparatus comprising:
 (a) a core component side having one or more core components thereon;
 (b) a cavity component side having one or more cavity components thereon, each of said one or more cavity components corresponding with the one or more core components; and
 (c) translation means for translating said one or more core components into a relatively even alignment with said corresponding one or more cavity components or for translating said one or more cavity components into a relatively even alignment with said corresponding one or more core components, or both, to thereby establish a relatively even fit between said one or more core components and said corresponding one or more cavity components when the respective components are pressed together wherein said translation means for said one or more core components comprises a lip around said one or more core components, said lip adapted to receive a fastener means and retain a gap on said lip and from said core component, said fastener means for fastening said one or more core components to a core plate and to permit lateral movement on said core plate to an extent approximately equal to said gap defined in said lip and from said core component.

11. The apparatus as claimed in claim 10 wherein said one or more core components are stand-alone core components, attached to and extending away from said core plate, whereby a significant space is defined between each of the said one or more core components at their point of attachment to said core plate.

12. The apparatus as claimed in claim 10 wherein said one or more cavity components are stand-alone cavity components, attached to and extending away from a cavity plate, whereby a significant space is defined between each of the said one or more cavity components.

* * * * *